United States Patent
Yasui et al.

(10) Patent No.: US 7,805,827 B2
(45) Date of Patent: Oct. 5, 2010

(54) METHOD OF PRODUCING A MAGNETIC HEAD SLIDER

(75) Inventors: Nobuto Yasui, Kanagawa (JP); Hiroshi Inaba, Yokohama (JP); Shinji Sasaki, Kanagawa (JP); Kazuhito Miyata, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 760 days.

(21) Appl. No.: 11/486,182

(22) Filed: Jul. 12, 2006

(65) Prior Publication Data

US 2007/0014050 A1     Jan. 18, 2007

(30) Foreign Application Priority Data

Jul. 14, 2005     (JP) ............... 2005-205220

(51) Int. Cl.
*G11B 5/127* (2006.01)
*H04R 31/00* (2006.01)

(52) U.S. Cl. .............. 29/603.03; 29/603.04; 29/603.06; 29/603.07; 29/603.15; 29/603.16; 216/22; 216/39; 216/41; 216/48; 360/235.1; 360/235.5; 360/235.7; 360/235.8; 360/236.1; 451/5; 451/41

(58) Field of Classification Search .............. 29/603.04, 29/603.06, 603.12; 216/22, 39, 41, 48; 360/235.1, 360/235.3, 235.7, 235.8, 236.1, 236.3, 246.2; 451/5, 41

See application file for complete search history.

(56) References Cited

U.S. PATENT DOCUMENTS

| | | | | |
|---|---|---|---|---|
| 4,647,494 A | * | 3/1987 | Meyerson et al. | 428/216 |
| 4,804,590 A | * | 2/1989 | Nakamura et al. | 428/408 |
| 5,480,695 A | * | 1/1996 | Tenhover et al. | 428/846.9 |
| 5,668,368 A | * | 9/1997 | Sakai et al. | 250/251 |
| 5,943,187 A | * | 8/1999 | Chen et al. | 360/235.2 |
| 6,569,295 B2 | * | 5/2003 | Hwang et al. | 204/192.3 |
| 6,583,953 B1 | | 6/2003 | Han et al. | |

FOREIGN PATENT DOCUMENTS

JP     2000-090423     3/2000

OTHER PUBLICATIONS

Jäger, H.U. and Belov, A. Yu., "ta-C Deposition Simulations: Film Properties and Time Resolved Dynamics of Film Formation", *Physical Review B 68*, 2003, pp. 024201.

State Intellectual Property Office of China (SIPO) office action dated Aug. 24, 2007 for SIPO patent application CN2006-10105839.

* cited by examiner

*Primary Examiner*—Paul D Kim
(74) *Attorney, Agent, or Firm*—Rambod Nader; Townsend and Townsend and Crew

(57) ABSTRACT

In one embodiment of the present invention, a method of producing a magnetic head slider comprises the steps of forming, on the air bearing surface of the slider, an air bearing surface overcoat, removing the surface region from a hard amorphous carbon film by the irradiation with an ion beam which is tilted with respect to a normal to the air bearing surface, and forming a rail in the air bearing surface on which the air bearing surface overcoat has been formed. A high density and covering performance are obtained when the angle of irradiating the ion beam is not smaller than about 60 degrees from a normal to the air bearing surface of the magnetic head slider and when the acceleration voltage for the ion beam is not higher than about 300 V in the step of removing part of the air bearing surface overcoat.

7 Claims, 13 Drawing Sheets

Fig. 4
(1) ETCH THE AIR BEARING SURFACE WITH AN ION BEAM
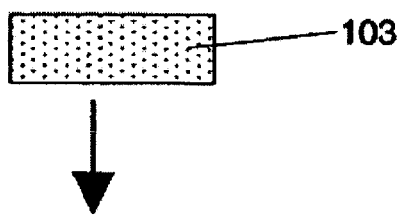
(2) FORM A LAYER FOR INTIMATELY ADHERING AN AIR BEARING SURFACE OVERCOAT
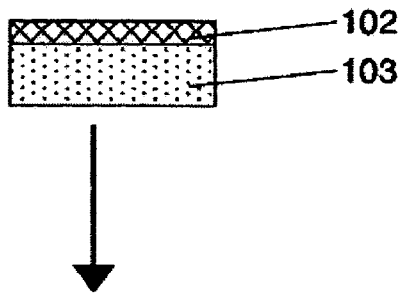
(3) FORM AN UPPERMOST LAYER OF THE AIR BEARING SURFACE OVERCOAT
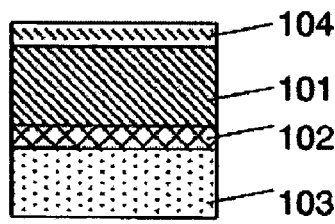
(4) PARTLY REMOVE THE AIR BEARING SURFACE OVERCOAT WITH AN ION BEAM
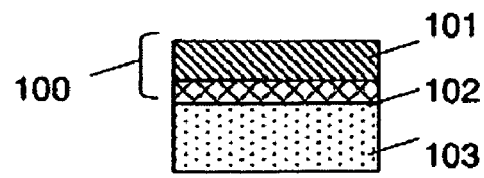

Fig. 5
(1) ETCH THE AIR BEARING SURFACE WITH AN ION BEAM
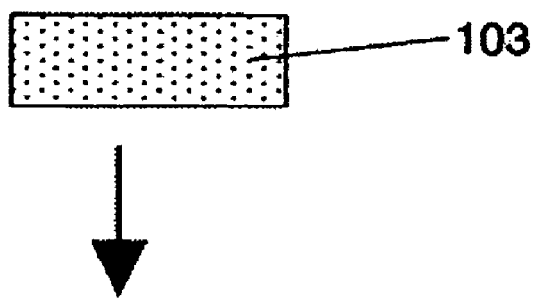
(2) FORM A LAYER FOR INTIMATELY ADHERING A/AIR BEARING SURFACE OVERCOAT
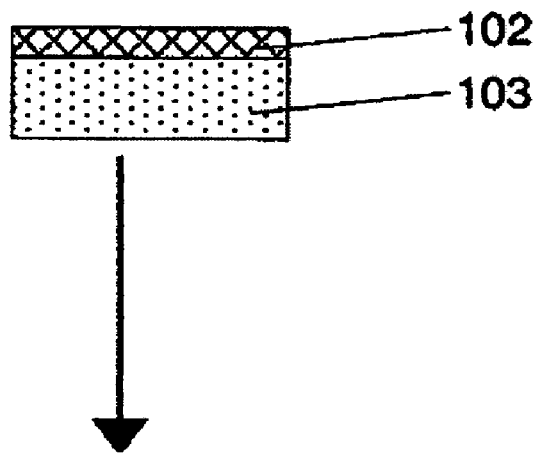
(3) FORM AN UPPERMOST LAYER OF THE AIR BEARING SURFACE OVERCOAT
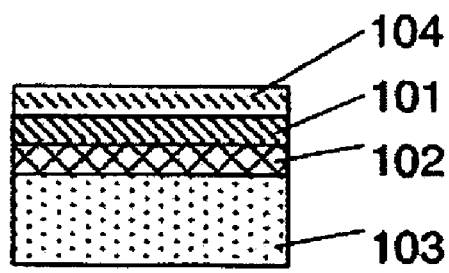

Fig. 6
(1) ETCH THE AIR BEARING SURFACE
WITH AN ION BEAM
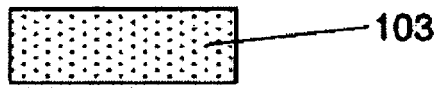
(2) FORM A LAYER FOR INTIMATELY ADHERING AN
AIR BEARING SURFACE OVERCOAT
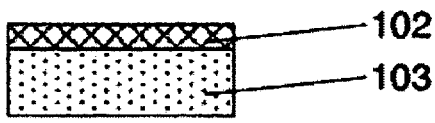
(3) FORM AN UPPERMOST LAYER OF THE
AIR BEARING SURFACE OVERCOAT
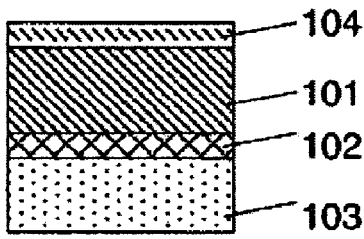
(4) PARTLY REMOVE THE AIR BEARING SURFACE OVERCOAT
BY MECHANICAL POLISHING OR WITH A GAS PLASMA
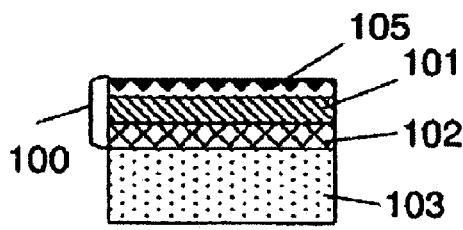

Fig. 17

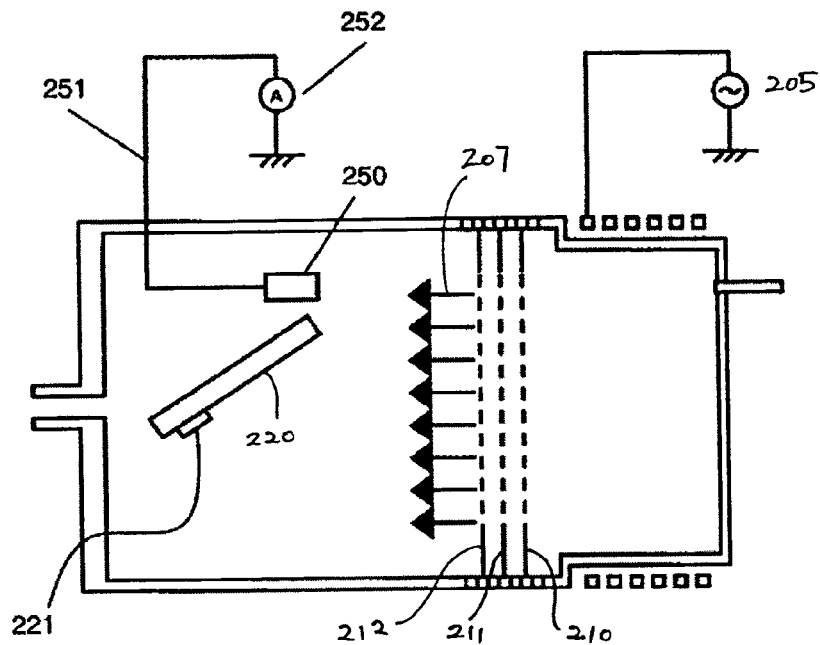

Fig. 18

| | FILM IS REMOVED BY | INITIAL FILM THICKNESS | THICKNESS OF PROTECTION FILM | SURFACE LAYER | STEP OF PRODUCTION | RELIABILITY TESTING |
|---|---|---|---|---|---|---|
| EX. 1 | ION BEAM | 3.0nm | 1.5nm | HARD LAYER | PROTECTION FILM FORMED ONCE | ACCEPTED |
| EX.2 | ION BEAM | 3.0nm | 1.5nm | HARD LAYER | PROTECTION FILM FORMED TWICE | ACCEPTED |
| EX.3 | ION BEAM | 3.0nm | 1.5nm | HARD LAYER | PROTECTION FILM FORMED TWICE | ACCEPTED |
| EX.4 | ION BEAM | 3.0nm | 1.5nm | HARD LAYER | SINGLE SLIDER | ACCEPTED |
| COMP.EX.1 | NONE | 1.5nm | 1.5nm | GRAPHITE LAYER | PROTECTION FILM FORMED ONCE | REJECTED |
| COMP.EX.2 | GAS PLASMA | 3.0nm | 1.5nm | DAMAGED LAYER | PROTECTION FILM FORMED ONCE | REJECTED |
| COMP.EX.3 | MECHANICAL POLISHING | 3.0nm | 1.5nm | DAMAGED LAYER | PROTECTION FILM FORMED ONCE | REJECTED |

METHOD OF PRODUCING A MAGNETIC HEAD SLIDER

CROSS-REFERENCES TO RELATED APPLICATIONS

This application claims priority from Japanese Patent Application No. JP2005-205220, filed Jul. 14, 2005, the entire disclosure of which is incorporated herein by reference.

BACKGROUND OF THE INVENTION

This invention relates to a method of producing a magnetic head slider equipped with a magnetic resistance element of the type of the giant magnetic resistance effect or the tunnel magnetic resistance effect, and to the magnetic head slider. More particularly, the invention relates to a method of forming a film for protecting an air bearing surface featuring excellent corrosion resistance and wear resistance.

Modern magnetic disk recording/reproducing devices are rapidly increasing their recording densities to cope with an increase in the amount of information to be processed accompanied, however, by an unavoidable technical problem for decreasing the magnetic spacing which is a distance between the magnetic head and the magnetic disk. However, a decrease in the flying amount of the magnetic head results in increased chances of contact or collision of a magnetic head slider with a magnetic disk surface that is revolving at a high speed. Therefore, the air bearing surface overcoat formed on the air bearing surface of the magnetic head slider must have a high wear resistance in addition to being thin and tough. On the other hand, a magnetic head element constituting the magnetic head slider includes a magnetic recording element and a magnetic resistance element which are both made of a magnetic material that is liable to be corroded. Therefore, the air bearing surface overcoat must also play the role of preventing the corrosion of the magnetic material. To meet these requirements, it has been desired to provide a thin film which does not permit dust and dirt to be left when sliding, which features excellent wear resistance, which has a high atomic density and is highly dense, and which further remains chemically stable. At present, there has been used a film stack of an amorphous carbon film and an amorphous silicon film as an air bearing surface overcoat since it satisfies the above requirements to some extent. The carbon film in the air bearing surface overcoat is formed relying upon a chemical vapor deposition (CVD) method, an ion beam evaporation method, a laser abrasion evaporation method or a filtered cathodic vacuum arc (FCVA) method. The amorphous carbon film is constituted by a diamond component and a graphite component. Here, the amorphous carbon film formed by using the above method contains the diamond component in a relatively large amount and, hence, exhibits excellent corrosion resistance and wear resistance.

There has been known that an attempt for further decreasing the thickness of the air bearing surface overcoat encounters the following problems. That is, the air bearing surface of the slider must be mechanically polished (lapped) prior to forming an air bearing surface overcoat on the air bearing surface of the slider. In the mechanical polishing, the height of the magnetic element is controlled by press-sliding the air bearing surface of the slider on a grinding machine in which the diamond grains are buried. However, the air bearing surface of the slider is constituted by several kinds of materials, that is, a substrate, an insulating film, a magnetic head element, a protection film and the like having different mechanical strengths leaving a problem of forming steps among the portions constituted by these materials after the mechanical polishing. When the steps are great near the magnetic head element on the air bearing surface of the slider, the coating performance of the air bearing surface overcoat formed after the mechanical polishing is deteriorated making it difficult to produce a magnetic head having a satisfactory corrosion resistance.

There has been reported in a non-patent document 1 (H. U. Jager et al., "ta-C deposition simulations: Film properties and time-resolved dynamics of film formation" (Physical Review B 68, 2003, pp. 024201)) that the hard amorphous carbon film formed by the CVD method, ion beam evaporation method, laser abrasion evaporation method or FCVA method contains a lesser diamond component and has a lower atomic density (hereinafter called surface graphite layer) in a region of a depth of from about 0.5 nm to about 1.5 nm from the film surface than those in the deeper regions. When the thickness of the air bearing surface overcoat is smaller than 3.0 nm, the surface graphite layer occupies an increased proportion of the whole film causing, as a result, a decrease in the corrosion resistance.

A patent document 1 (JP-A-2000-90423) discloses a technology for solving part of the above problem. Namely, the patent document 1 discloses a method of producing a magnetic head slider comprising a step of forming a hard amorphous carbon film on the air bearing surface of the magnetic head slider, and a step of forming a protection film by removing the surface region having low wear resistance from the hard amorphous carbon film by mechanical polishing or by the irradiation with a gas plasma. According to this method of producing the magnetic head slider, there can be provided a magnetic head formed with a very thin air bearing surface overcoat having excellent wear resistance by utilizing a dense inner region only.

BRIEF SUMMARY OF THE INVENTION

However, the magnetic head slider produced according to the patent document 1 is accompanied by such a problem that when the mechanical polishing method is employed in the step of removing the surface region of the hard amorphous carbon film, the yield decreases since it is difficult to control the amount of polishing, and the coating performance decreases due to scratches formed during the lapping causing the corrosion resistance to decrease.

Further, when the gas plasma is used in the step of removing the surface region of the hard amorphous carbon film, the hard amorphous carbon film is damaged and the density thereof decreases in the inner region other than in the surface region that is to be removed. Further, the surface is roughened deteriorating the coating performance. As a result, the corrosion resistance and the wear resistance decrease.

This invention was accomplished in order to solve the above problems, and has a feature of providing a magnetic head slider having an air bearing surface overcoat which features excellent corrosion resistance and wear resistance despite its very small thickness.

When the gas plasma is used as means for removing part of the air bearing surface overcoat, there remains the problem in that the hard amorphous carbon film is damaged and the density thereof decreases in the inner region other than the surface region that is to be removed and, besides, the coating performance decreases due to roughened surface as described above. It was found through the study conducted by the present inventors that the above problem is caused by ions in the gas plasma having energy of not smaller than about 100 eV and impinging vertically onto the substrate that is to be treated.

First, described below is a decrease in the density of the protection film being caused by the gas plasma. When the ions fall on the hard amorphous carbon film under the above conditions, the incident ions penetrate into a depth of about 1 nm to about 2 nm from the surface, wherein the diamond component in the hard amorphous carbon film undergoes a phase transformation into a graphite component due to the diffusion of heat energy causing, as a result, a decrease in the density of the amorphous carbon film. Next, described below is a cause of roughening the surface. When the ionic irradiation is in parallel with the direction of normal to the substrate that is to be treated, the energy due to the ionic irradiation concentrates in the dented portions as compared to the protruded portions, causing the occurrence of sputtering. Therefore, the dented portions are further ground and, hence, the surface roughness further increases.

In one aspect of this invention, it was confirmed that the above problem can be solved by removing the surface region of the hard amorphous carbon film by using an ion beam tilted with respect to the direction of normal to the surface of the substrate to be treated. When the ion beam is irradiated being tilted to a sufficient degree with respect to the surface of the substrate to be treated, first, the depth of penetration of the ion beam in the hard amorphous carbon film decreases, and the diamond component is prevented from undergoing a phase transformation into the graphite component. Concerning the surface roughness, further, the protruding portions on the surface are preferentially ground, and the surface roughness decreases after the treatment.

This invention was accomplished based on the above discovery. That is, to solve the above problem, a method of producing a magnetic head slider of this invention comprises a step of forming an air bearing surface overcoat on the air bearing surface of the slider, and a step of removing part of the air bearing surface overcoat, wherein the step of removing part of the air bearing surface overcoat is conducted by using an ion beam that is tilted with respect to the normal to the air bearing surface.

The air bearing surface overcoat is a single film of hard amorphous carbon or a film stack of the hard amorphous carbon film and an intimately adhering film containing silicon. To obtain an air bearing surface overcoat having excellent corrosion resistance and wear resistance, the amount of the diamond component in the hard amorphous carbon film must not be smaller than about 45% and, desirably, in a range of about 60 to 85%.

In the step of removing part of the air bearing surface overcoat, a high density and a high covering performance are obtained when the angle of irradiation of the ion beam is not smaller than about 45 degrees but is smaller than 90 degrees from the normal to the air bearing surface of the magnetic head slider and when the acceleration voltage of the ion beam is not higher than about 300 V.

The air bearing surface overcoat of the invention exhibits a particularly high density and covering performance when the air bearing surface overcoat formed on the air bearing surface of the slider in the step of forming the air bearing surface overcoat has a thickness which is greater by not less than about 0.5 nm than the desired thickness of the air bearing surface overcoat.

By using an arc discharge, the hard amorphous carbon film in the air bearing surface overcoat becomes capable of containing the diamond component in a particularly large amount.

In the step of removing part of the air bearing surface overcoat, the ion beam is irradiated while observing the amount of removing the thickness of the air bearing surface overcoat, making it possible to form an air bearing surface overcoat of a desired thickness maintaining good precision and, hence, to produce a magnetic head maintaining a high yield. Concretely speaking, this is realized by irradiating a sample for measuring the film thickness placed near the magnetic slider on a sample holder in the film-forming device with light, and measuring the film thickness in real time by utilizing the ellipsometry which is for analyzing the film thickness from the polarized state of the reflected light.

The thickness of the film to be removed can be measured not only by the ellipsometry but also by utilizing a device that measures the ion beam current in the ion beam being irradiated.

According to the present invention, there can be formed an air bearing surface overcoat which is dense having good covering performance. Further, there can be provided a magnetic head having an air bearing surface overcoat featuring excellent corrosion resistance and wear resistance despite its very small thickness.

BRIEF DESCRIPTION OF THE DRAWINGS

FIG. 4 is a diagram illustrating a process flow for forming an air bearing surface overcoat of Example 1;

FIG. 5 is a diagram illustrating a process flow for forming the air bearing surface overcoat of Comparative Example 1;

FIG. 6 is a diagram illustrating a process flow for forming the air bearing surface overcoats of Comparative Examples 2 and 3;

FIG. 11 is a graph illustrating the dependency of the diamond component in the surface of the hard amorphous carbon film upon the amount of removal by ion beam etching;

FIG. 12 is a graph illustrating the dependency of the surface roughness of the hard amorphous carbon film upon the amount of removal by ion beam etching;

FIG. 17 is a view schematically illustrating a further ion beam irradiation apparatus used for the method of producing the magnetic head slider of the invention; and FIG. 18 is a diagram showing the results of corrosion testing carried out in Examples 1 to 4 and in Comparative Examples 1 to 3.

DETAILED DESCRIPTION OF THE INVENTION

Examples of the invention will now be described with reference to the drawings.

Example 1

Figure 1:
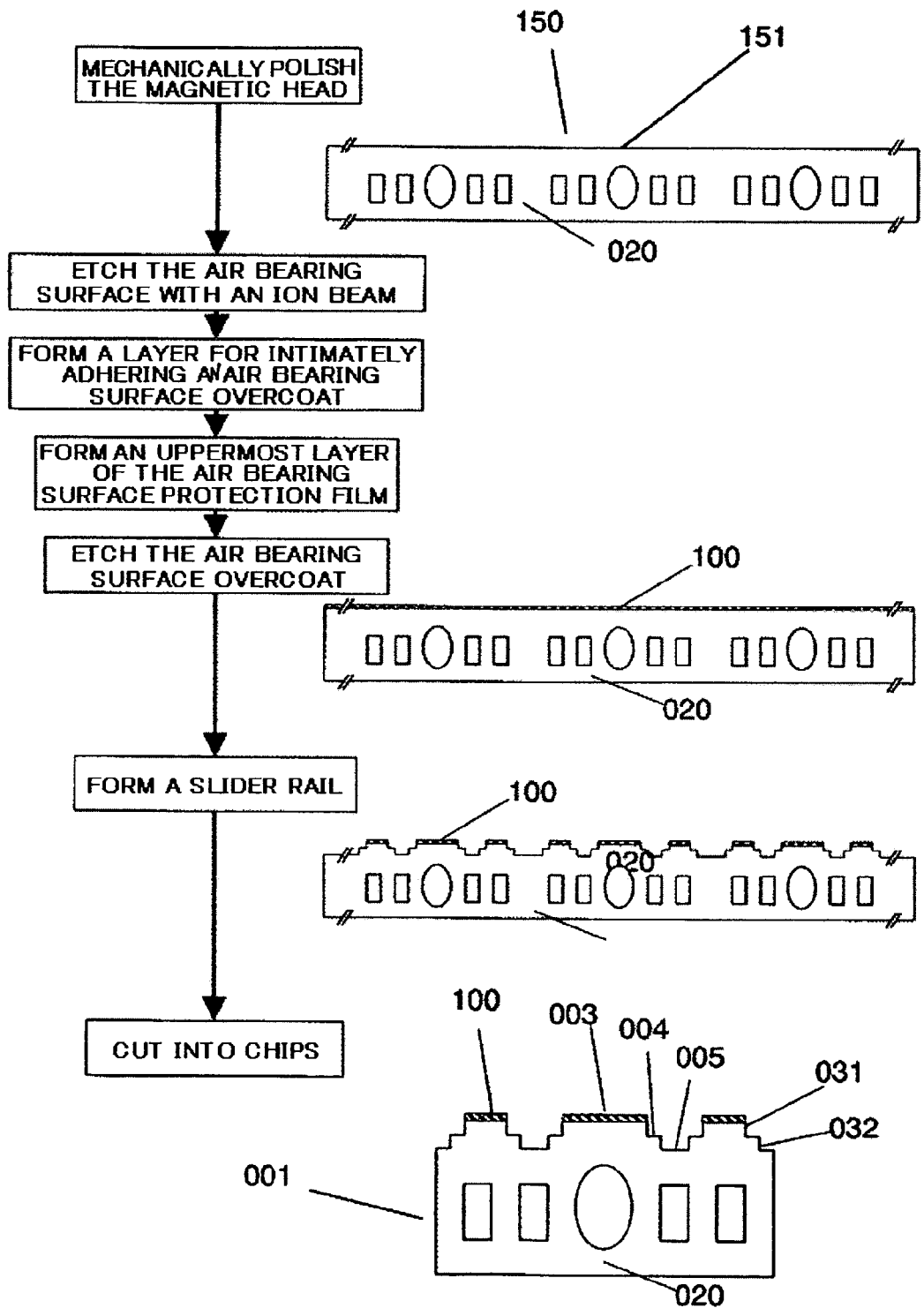
FIG. 1 is a diagram of a process flow illustrating a method of producing a magnetic head slider according to Example 1.

FIG. 1 is a diagram of a process flow illustrating a method of producing a magnetic head slider according to Example 1 of the invention. First, a magnetic head formed on a substrate of alumina titanium carbide is cut as a magnetic head rowbar 150 in the form of a short strip. The magnetic head rowbar 150 has a working surface 151 and an air-flow out edge 020. Thereafter, by using, for example, a rotary table burying diamond grains therein, the working surface (that becomes the air bearing surface) 151 of the magnetic head rowbar 150 is mechanically polished such that the magnetic head element assumes a desired size.

After the size of the magnetic head element is determined through the step of mechanical polishing, the magnetic head rowbar 150 is introduced into a vacuum chamber for forming an air bearing surface overcoat. In the vacuum chamber, the magnetic head rowbar 150 is placed on a rotary sample plate, is rotated and is subjected to a treatment described below. Namely, the magnetic head rowbar 150 is transferred onto a substrate position for treatment with ion beam etching, and its air bearing surface is cleaned by ion beam etching. This step may be conducted by sputter etching by using a gas plasma.

Next, the magnetic head rowbar 150 is transferred onto a substrate position for forming a layer 102 (see FIG. 4) for intimately adhering the air bearing surface overcoat. A silicon target to which a bias can be applied is disposed at a position facing the substrate position for forming the layer 102 for intimately adhering the air bearing surface overcoat. Here, a bias voltage is applied to the silicon target as an argon gas is introduced into the vacuum chamber thereby to form an amorphous silicon film of 0.5 nm as the layer 102 for intimately adhering the air bearing surface overcoat. A material constituting the layer 102 for intimately adhering the air bearing surface overcoat is not limited to the amorphous silicon film, but may be a film containing any one of, for example, silicon, tungsten, chrome or titanium, or may be a nitride, an oxide or an oxynitride of any one of the above films. Further, the film may be formed not only by the sputtering method but also by a thermal vacuum evaporation method or a CVD method.

Thereafter, the magnetic head rowbar 150 is transferred to a substrate for forming an uppermost layer 101 of the air bearing surface overcoat. Here, the uppermost layer 101 (see FIG. 4) of the air bearing surface overcoat comprising a hard amorphous carbon film is formed of 2.5 nm by relying upon the cathodic vacuum arc method. The hard amorphous carbon film can be formed by a CVD method, an ion beam method or a laser abrasion evaporation method.

Next, the magnetic head rowbar 150 is transferred again onto the substrate position for the ion beam etching treatment to carry out the treatment by ion beam etching. Here, the ion beam energy is 100 eV (electron volts), and the angle of incidence of ions is 75 degrees. The kind of ions is argon. The ion beam energy stands for an average energy possessed by ions in the beam. Further, the angle of incidence of ions is an angle of incidence of the ion beam with respect to a normal to the air bearing surface of the magnetic head slider. In this step, the hard amorphous carbon film is removed by 1.5 nm.

Formation of the air bearing surface overcoat 100 is finished through the above steps. Next, an air bearing surface rail is formed in the working surface 151 of the magnetic head rowbar 150. In this step, the working surface 151 of the magnetic head rowbar 150 is selectively worked by ionic milling thereby to form a first surface 003, a second surface 004 and a third surface 005 that constitute the air bearing surface.

Finally, the magnetic head rowbar 150 is mechanically cut into individual magnetic heads to complete magnetic head sliders 001.

The protection film can be partly removed by the irradiation with an ion beam under any conditions without being limited to the above conditions provided the hard amorphous carbon film is not damaged. Though ions of argon (Ar) were used in this Example, any rare gas such as neon (Ne), helium (He), krypton (Kr) or xenon (Xe) can be used to obtain the same effect, under the condition that the hard amorphous carbon film is not damaged. In addition to the above rare gases, further, one can use reactive molecules including oxygen, nitrogen, fluorine or chlorine to obtain the same effect. In the step of removing part of the air bearing surface overcoat 100 in this Example, dispersion in the thickness of the removed film is suppressed by irradiating the ion beam while observing the film thickness by using the ellipsometer. Means for controlling the film thickness is not limited to the ellipsometer but may be an instrument for measuring an ion beam current. When the film thickness can be controlled to a sufficient degree, the above means for controlling the film thickness need not be employed.

Next, the formation of the air bearing surface overcoat 100 on a substrate or slider 103 according to this Example will be described with reference to FIG. 4. Portions overlapping the steps of FIG. 1 are not described here again. In forming the uppermost layer 101 of the air bearing surface protection layer by using the hard amorphous carbon film as shown in FIG. 4(3), a surface graphite layer 104 which is not dense is formed near the surface up to a depth of about 1.0 nm. Referring to FIG. 4(4), after the air bearing surface protection layer 100 is partly removed by the ion beam, the surface graphite layer 104 is removed and the uppermost layer 101 of the air bearing surface overcoat is becoming dense. Measurement based on the X-ray photoelectron spectroscopy (XPS) reveals the presence of the diamond component to be about 60% in a region of a depth of 2 nm from the surface. Further, measurement based on the AFM reveals the surface roughness Rmax to be about 0.8 nm. Rmax is a maximum height of a portion cut away from a sectional curve by a reference length.

Figure 7:
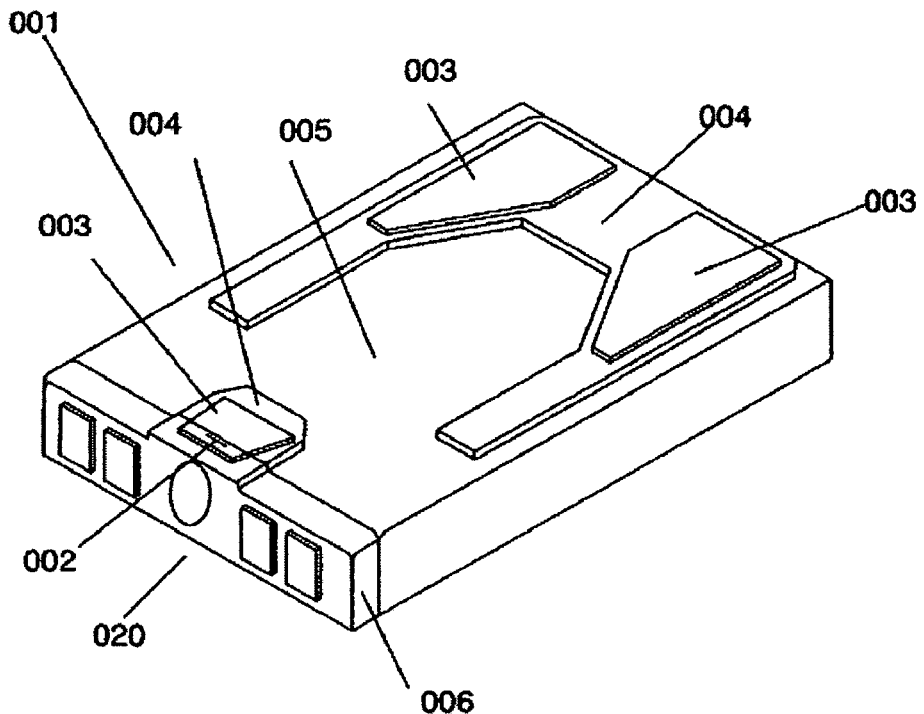
FIG. 7 is a perspective view of a magnetic head slider to which the invention is applied.

Here, the magnetic head slider produced according to this Example will be described with reference to FIGS. 7 and 8. The base material (slider) of the magnetic head slider 001 shown in FIG. 7 is made of alumina titanium carbide, and a magnetic head element 002 is formed in an alumina protection film 006. However, the base material of the magnetic head slider 001 and the material of the protection film 006 wrapping the magnetic head element 002 are not limited thereto only. The base material of the magnetic head slider 001 may be silicon and the material of the protection film 006 may be a silicon oxide. The magnetic head element 002 is provided on the first surface 003 which is closest to a magnetic medium facing the air bearing surface of the magnetic head slider. However, protruded surfaces may be formed on the first surface 003 to be closer to the magnetic disk in order to decrease the sticking force in case the magnetic head element comes into a halt on the magnetic disk and comes in contact therewith.

In Example 1, the first surface 003 through the third surface 005 are substantially in parallel, the depth from the first surface 003 to the second surface 004 being 150 nm and the depth from the second surface 004 to the third surface 005 being 850 nm. This, however, does not apply to the depth from the first surface 003 to the second surface 004 or to the depth from the second surface 004 to the third surface 005. In this Example, further, the air bearing surface is constituted by the surfaces having three different heights though there is no limitation to the number of the surfaces.

Figure 8:
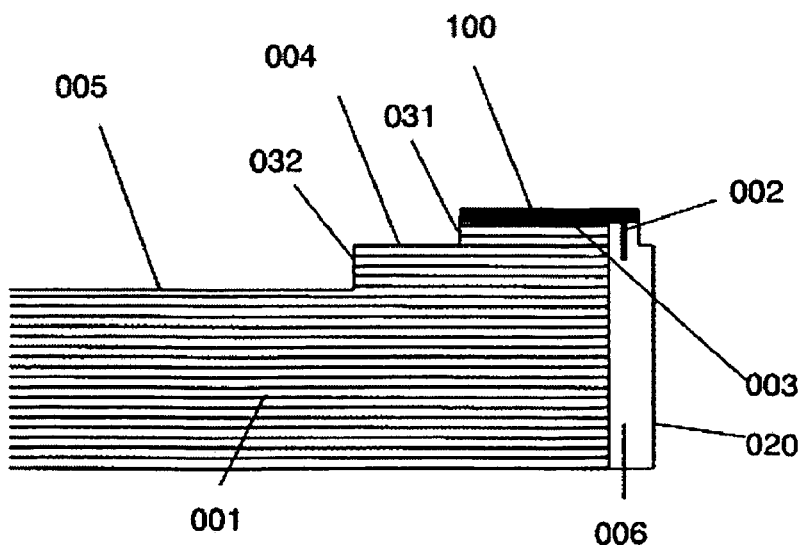
FIG. 8 is a view schematically illustrating, in cross section, part of the magnetic head slider of FIG. 7.

FIG. 8 is a sectional view schematically illustrating a portion of the magnetic head slider 001. The side wall 031 is a surface constituting a step between the first surface 003 and the second surface 004, and the side wall 032 is a surface constituting a step between the second surface 004 and the third surface 005. In this Example, the air bearing surface overcoat 100 is formed on the first surface 003 only.

Figure 9:
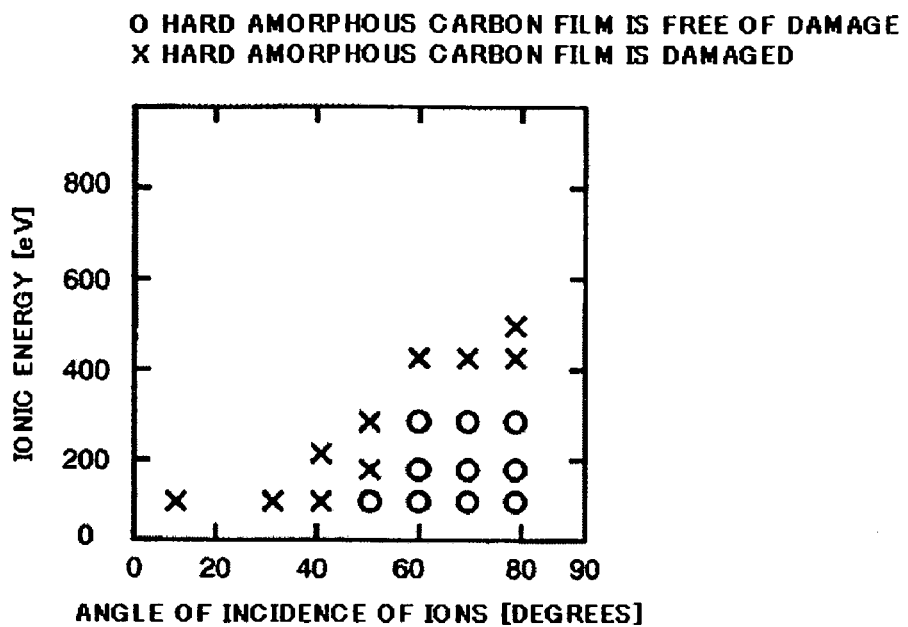
FIG. 9 is a graph illustrating damages to the hard amorphous carbon film caused by the ionic irradiation, and a relationship between the ionic energy and the angle of incidence of ions.

Next, described below in detail are the ion beam irradiation step for removing part of the air bearing surface overcoat 100 shown in FIG. 4(4) and the conditions for ion beam irradiation. FIG. 9 is a graph illustrating the angle of incidence of the ion beam and the damages to the hard amorphous carbon film due to the ion beam energy, and FIG. 10 is a graph illustrating the angle of incidence of the ion beam and the effect of the ion beam energy on the surface roughness of the hard amorphous carbon film.

In FIG. 9, X represents the conditions that give damage to the hard amorphous carbon film, i.e., the conditions for decreasing the diamond component and increasing the graphite component, and O represents the conditions that do not give damage. Here, the diamond component was measured by the X-ray photoelectron spectroscopy (XPS). The XPS makes it possible to measure a ratio of the diamond component and the graphite component in the carbon film from a photoelectron spectrum of the trajectory of carbon Is. In this Example, the content of diamond component is about 45% at the depth of 2 nm from the surface of the hard amorphous carbon film that was formed by the cathodic vacuum arc method. In FIG. 9, O represents the content of diamond components that is not smaller than about 45% after having been irradiated with the ion beam, and X represents the content thereof of smaller than about 45%. As shown, it is learned that the hard amorphous carbon film is more damaged with an increase in the ion beam energy or with a decrease in the angle of incidence of ions. It has been confirmed that the hard amorphous carbon film exhibits a decreased corrosion resistance when the content of the diamond component therein decreases due to the irradiation with the ion beam. It is therefore desired to irradiate the ion beam under the conditions represented by O in the drawing. That is, the conditions for increasing the amount of the diamond component in the hard amorphous carbon film formed on the air bearing surface of the slider are in a range where the ionic energy is not greater than about 300 eV and the angle of incidence of ions is not smaller than about 50 degrees.

Figure 10:
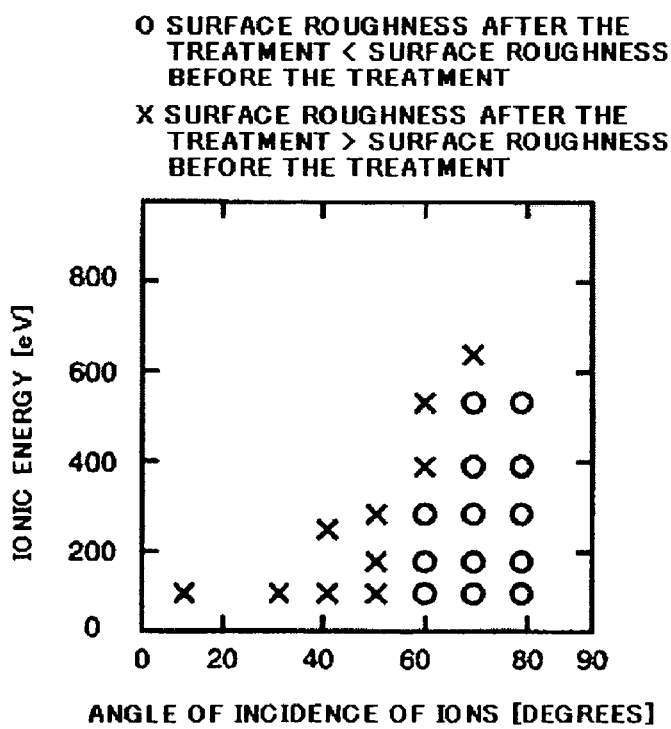
FIG. 10 is a graph illustrating the effect of the ionic irradiation upon the surface roughness of the hard amorphous carbon film, and a relationship between the ionic energy and the angle of incidence of ions.
Figure 1:
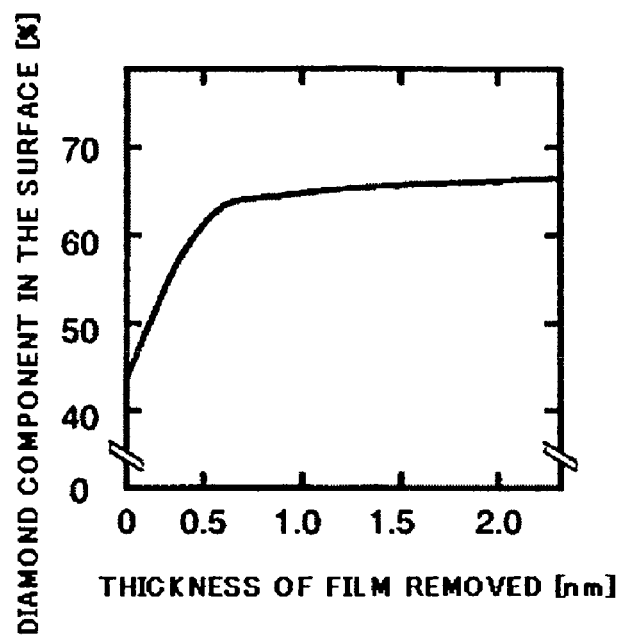
Figure 1:
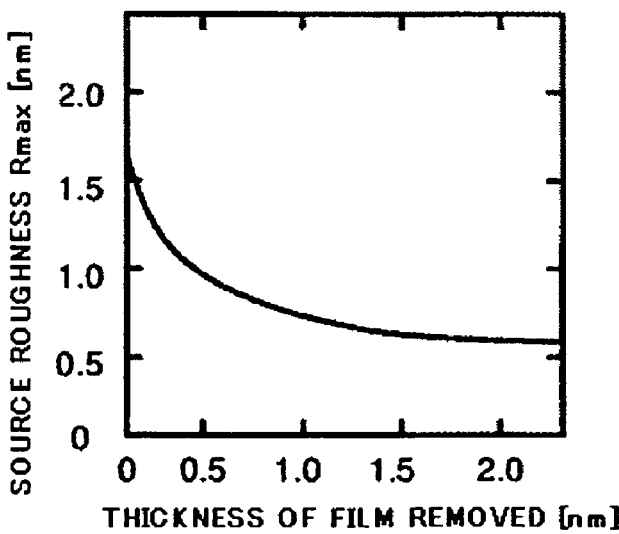

Referring to FIG. 10, it is confirmed that the surface roughness increases with an increase in the ion beam energy or with a decrease in the angle of incidence of ions. The surface roughness is measured by using an atomic force microscope (AFM) before and after the surface of the hard amorphous carbon film is irradiated with the ion beam. The surface roughness Rmax before being irradiated with the ion beam is about 1.5 nm. Referring to FIG. 10, after having been irradiated with the ion beam, the surface is measured again by the same measuring method, wherein X represents the conditions under which the surface roughness increases and O represents the conditions under which the surface roughness decreases. As a result, the conditions for decreasing the surface roughness (Rmax) of the hard amorphous carbon film formed on the air bearing surface of the slider desirably lie in a region where the ionic energy is not greater than about 500 eV and the angle of incidence of ions is not smaller than about 60 degrees.

As described above, in order to obtain the hard amorphous carbon film satisfying desired characteristics and a geometrical shape, it is desired from the results of FIGS. 9 and 10 that the ionic energy is not smaller than about 25 eV but is not larger than about 300 eV and the angle of incidence of ions is not smaller than about 60 degrees but is larger than about 90 degrees. When the ionic energy is about 100 eV and the angle of incidence of ions is about 75 degrees, in particular, there can be provided an air bearing surface overcoat 100 having excellent corrosion resistance. The lower limit of the ionic energy is set to be a value at which the hard amorphous carbon film can be sputtered.

Next, described below is the amount of removing the air bearing surface overcoat 100. FIG. 11 shows the effect of the amount of removing the air bearing surface overcoat 100 upon the diamond component in the surface of the hard amorphous carbon film. Further, FIG. 12 shows the effect of the amount of removing the air bearing surface overcoat 100 on the surface roughness Rmax of the air bearing surface overcoat. The data shown in these graphs are those of when the ion beam is irradiated under the conditions of the angle of incidence of ions of about 75 degrees and the ion beam energy of about 100 eV. Accompanying an increase in the amount of removal as shown, the diamond component increases in the surface and the surface roughness Rmax decreases. Particularly, a large change is observed up to the removing amount of 0.5 nm. From these results, it is learned that particularly excellent properties are obtained when the air bearing surface overcoat 100 is removed by an amount of not smaller than about 0.5 nm.

Figure 15:
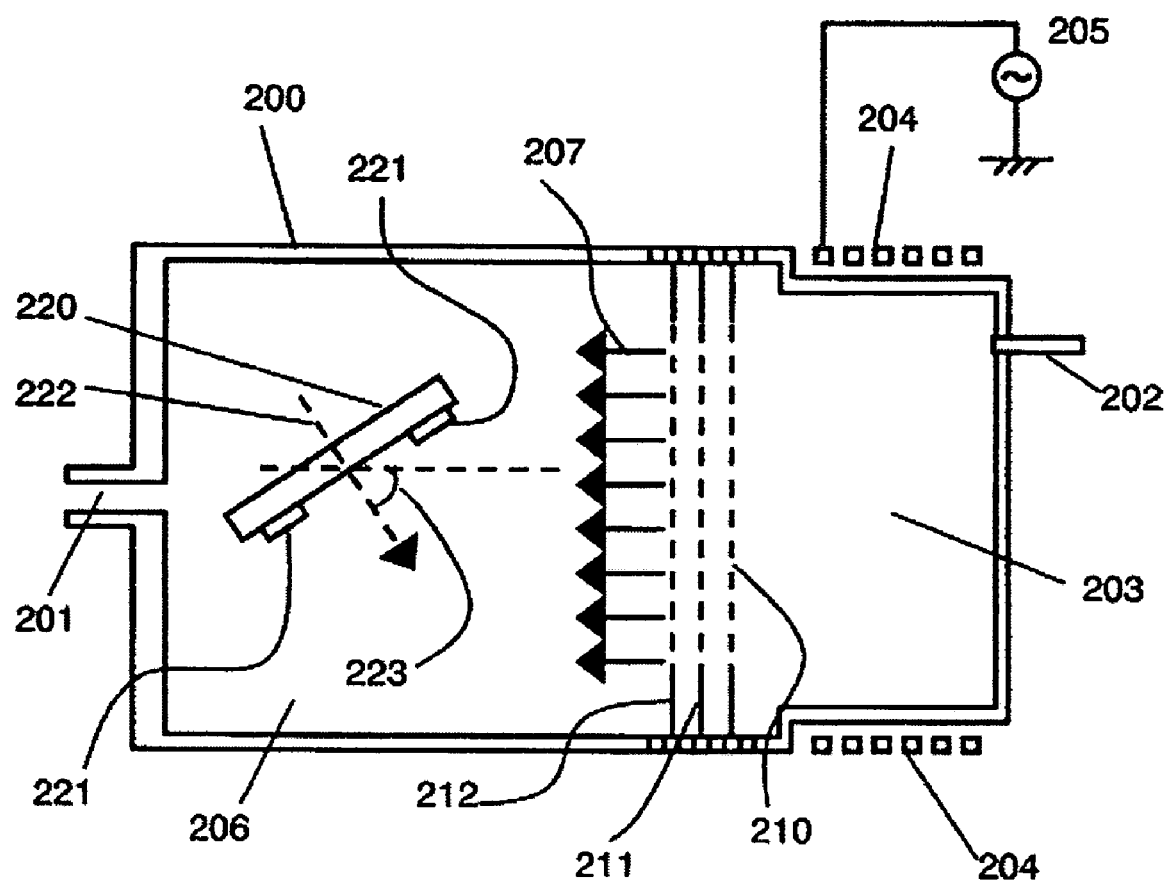
FIG. 15 is a view schematically illustrating an ion beam irradiation apparatus used for a method of producing a magnetic head slider of the invention.

An ion beam etching apparatus used in this Example will now be described. FIG. 15 is a diagram illustrating the constitution of the ion beam etching apparatus. The interior of the vacuum chamber 200 is evacuated through an exhaust port 201 and at the time of irradiation with the ion beam, the gas is introduced into a plasma-forming chamber 203 through a gas introduction port 202. The plasma-forming chamber 203 is surrounded by a coil 204. Upon applying a high-frequency voltage to the coil 204 from an RF power source 205, a plasma can be formed in the plasma-forming chamber 203. Three pieces of electrodes are provided between the plasma-forming chamber 203 and a sample machining chamber 206. There are provided a first electrode 210, a second electrode 211 and a third electrode 212 from the side of the plasma-forming chamber 203. Upon applying a suitable voltage to these electrodes, an ion beam 207 is emitted. A magnetic head rowbar 221 to be treated is placed on a sample holder 220. The sample holder 220 can be tilted with respect to the direction of incidence of the ion beam 207. The ion beam 207 is incident on the sample to be treated at an ion irradiation angle 223. The ion irradiation angle 223 is subtended by the direction of incidence of the ion beam 207 and a normal 222 to the surface of the sample holder. While being irradiated with the ion beam, the sample holder 220 rotates on a plane with its centerline as an axis. FIG. 15 illustrates a vacuum chamber capable of carrying out the treatment with the ion beam. The vacuum chamber, however, may include devices for conducting any other processes and for forming a carbon film or a silicon film.

Figure 16:
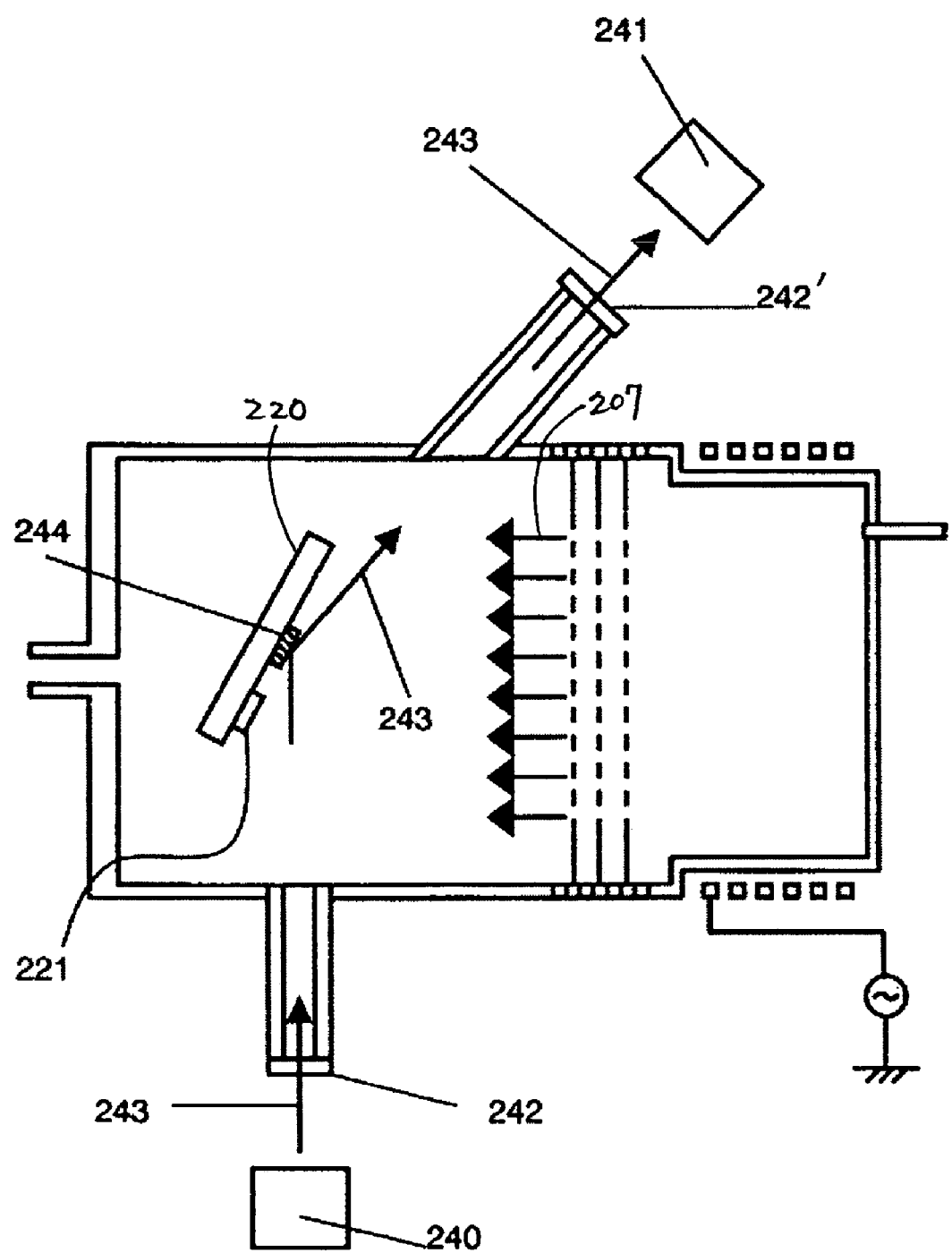
FIG. 16 is a view schematically illustrating another ion beam irradiation apparatus used for the method of producing the magnetic head slider of the invention.

Another ion beam etching apparatus will be described next with reference to FIG. 16. The ion beam etching apparatus used here is an ion beam irradiation apparatus equipped with an ellipsometer to measure the amount of etching while being irradiated with the ion beam. A sample 244 for measuring the thickness of the film is provided at the center of the sample holder 220 to monitor the thickness of the film. Light 243 emitted from the source of light 240 enters the vacuum chamber 200 through a window 242, changes its direction being reflected by the surface of the sample 244 for measuring the thickness of the film, goes out of the vacuum chamber 200 through the window 242' and is detected by a light detector 241. There may be employed a mechanism for rotating the sample holder 220 so that large areas can be uniformly irradiated with the ion beam. In this case, the measuring precision can be improved by attaching the sample 244 for measuring the thickness of the film to the center of the sample holder 220, so that the position will not be varied by the rotation. The thickness of the sample 244 for measuring the thickness of the film is successively calculated by a computer, and is fed back to the outputs of the RF power source 205, first electrode 210, second electrode 211 and third electrode 212. As described above, use of the ion beam irradiation apparatus makes it possible to improve the precision of the thickness of the air bearing surface overcoat that is formed.

A further ion beam etching apparatus will be described next with reference to FIG. 17. The ion beam etching apparatus used here is an ion beam irradiation apparatus capable of measuring the amount of ion beam current so as to measure the amount of etching while being irradiated with the ion beam. A device 250 for measuring the ion beam current is provided near the sample holder 220. While being irradiated with the ion beam, the ion beam 207 partly collides with the device 250 for measuring the ion beam current, and the electric charge produced by the collision flows through a conductor 251 and is measured by an ammeter 252. The device 250 for measuring the ion beam current is disposed in a range irradiated with the ion beam 207. A correlation has been found in advance between the currents of the device 250 for measuring the ion beam current and the etching amount of the sample 221 being treated. Here, though the device 250 for measuring the ion beam current is disposed near the sample holder 220, it may exist on the sample holder 220. The amount of current measured by the ammeter 252 is integrated by a computer, and the result thereof is fed back to the RF power source 205, first electrode 210, second electrode 211 and third electrode 212. Use of the ion beam irradiation apparatus makes it possible to improve the precision of the thickness of the air bearing surface overcoat that is formed.

Comparative Example 1

Described below with reference to FIG. 5 is a method of producing a magnetic head slider of Comparative Example 1 in comparison with the method of producing the magnetic head slider of Example 1 above. Portions overlapping those of Example 1 are omitted. According to Comparative Example 1, the etching with the ion beam is effected for the air bearing surface of the magnetic head rowbar 150 introduced into the vacuum chamber for forming the air bearing surface overcoat 100. Next, an amorphous silicon film is formed of 0.5 nm as a layer 102 for intimately adhering the air bearing surface overcoat. Finally, a hard amorphous carbon film is formed of 1.0 nm by the cathodic vacuum arc method as the uppermost layer 101 of the air bearing surface protection layer. The air bearing surface overcoat 100 has a graphite layer 104 on the surface thereof. The amount of the diamond component is measured by the XPS to be about 45%. Further, a measurement by the AFM reveals the surface roughness Rmax to be 1.5 nm. The amounts of rare gases such as He, Ne, Ar, Kr and Xe contained in the air bearing surface overcoat are measured by using the XPS to be not larger than about 2 atomic % in a region of a depth of about 1 nm from the surface.

Comparative Example 2

Described below next with reference to FIG. 6 is a method of producing a magnetic head slider of Comparative Example 2 in comparison with the method of producing the magnetic head of Example 1 above. Portions overlapping those of Example 1 are omitted. According to Comparative Example 2, the air bearing surface is etching with the ion beam. Next, an amorphous silicon film is formed of 0.5 nm as a layer 102 for intimately adhering the air bearing surface overcoat and, thereafter, a hard amorphous carbon film is formed of 2.5 nm as the uppermost layer 101 of the air bearing surface protection layer. After the uppermost layer 101 has been formed for the air bearing surface overcoat, an argon gas is introduced into the vacuum chamber and is so controlled that the degree of vacuum in the container is about 10 mTorr. Next, a voltage of a radio frequency of 30 W is applied to the sample plate on which the magnetic head rowbar 150 has been placed to generate a gas plasma thereby to remove the air bearing surface overcoat 100 by 1.5 nm. In this case, the DC bias for the sample plate is about −150 V.

The air bearing surface overcoat 100 formed in Comparative Example 2 has a damaged layer 105 formed on the surface thereof due to argon ions in the gas plasma falling in parallel with the direction of normal to the air bearing surface. The amount of the diamond component is measured by the XPS to be about 30 to about 35%. Further, a measurement by the AFM reveals the surface roughness Rmax to be 1.8 nm.

Comparative Example 3

Described below next with reference to FIG. 6 is a method of producing a magnetic head slider of Comparative Example 3. In Comparative Example 3, unlike in Comparative Example 2, the air bearing surface overcoat 100 is partly removed by mechanical polishing instead of using the gas plasma. After the uppermost layer 101 of the air bearing surface overcoat has been formed, the magnetic head rowbar 150 is taken out of the vacuum chamber and is mounted on a jig for mechanical polishing. By using a rotary table in which the diamond grains have been buried, the air bearing surface overcoat 100 of the magnetic head rowbar 150 is removed by 1.5 nm. The air bearing surface overcoat 100 formed in Comparative Example 3 is scratched on the surface thereof due to diamond grains on the rotary table. The amount of the diamond component is measured by the XPS to be about 30% to about 35%. Further, a measurement by the AFM reveals the surface roughness Rmax to be 2.8 nm.

Example 2

Figure 2:
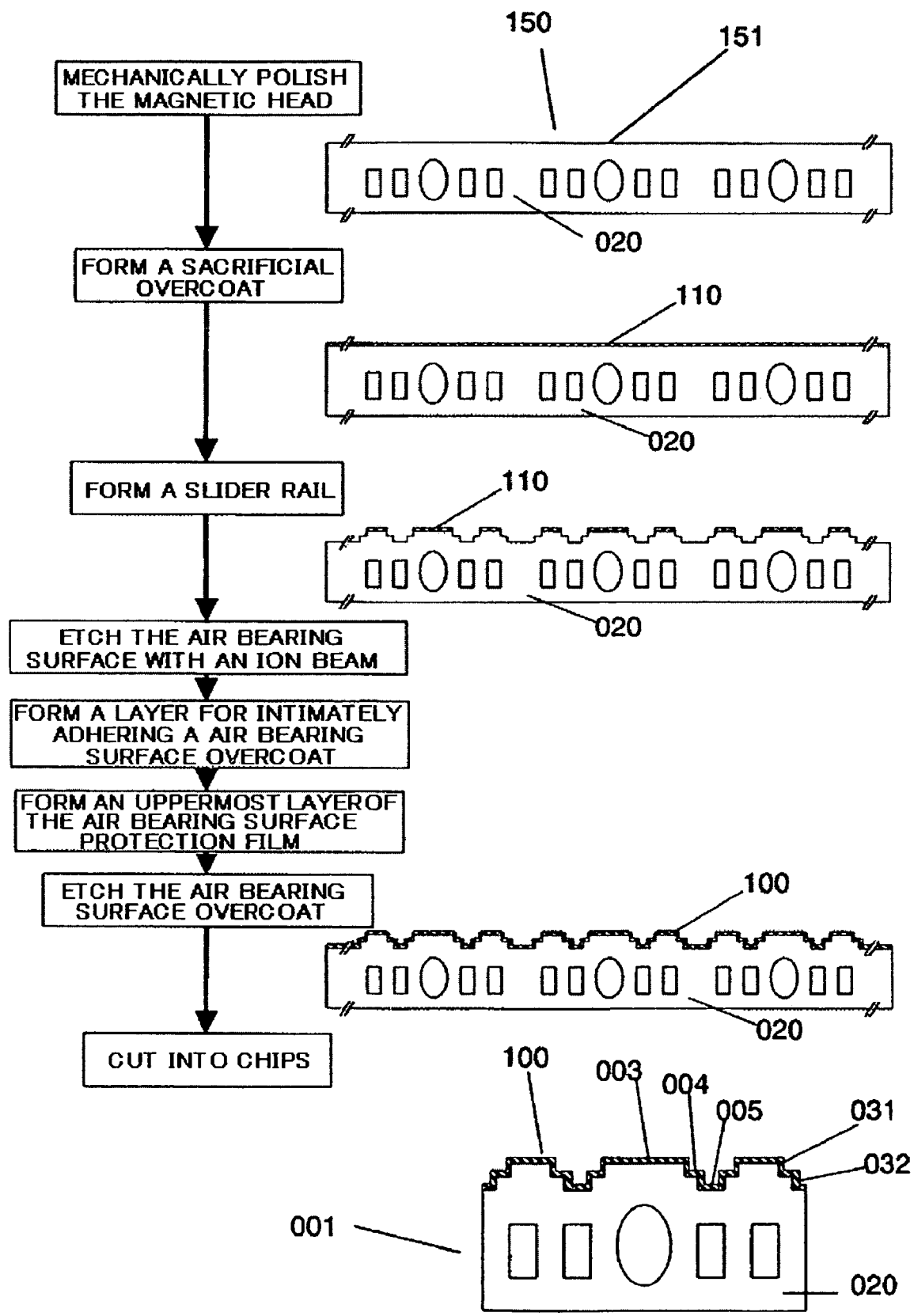
FIG. 2 is a diagram of a process flow illustrating the method of producing the magnetic head slider according to Example 2.

Described below with reference to FIG. 2 is a method of producing a magnetic head slider of Example 2. Portions overlapping the method of producing the magnetic head slider of Example 1 are omitted. As compared to Example 1, Example 2 has a feature in that the protection film is formed twice in the step of producing the magnetic head slider. A sacrificial overcoat 110 is formed on the magnetic head rowbar 150 after the mechanical polishing. The sacrificial overcoat 110 is the one for preventing the magnetic head element from being corroded in the step of forming the slider rail. In this Example, the air bearing surface overcoat 100 is formed after the slider rail is formed and after the sacrificial overcoat 110 is removed.

Example 2 will be described in detail with reference to FIG. 2. After the magnetic head has been mechanically polished, the machined surface 151 is, first, cleaned by etching with the ion beam in a vacuum chamber. Next, the sacrificial overcoat 110 is formed by forming a layer of silicon for intimately adhering the sacrificial overcoat in a thickness of 2.0 nm and, thereafter, forming a hard amorphous carbon film in a thickness of 10.0 nm by the cathodic vacuum arc method. The sacrificial overcoat 110 is not limited to a film stack of the intimately adhering layer and the hard amorphous carbon film, but may be a single film of silicon, a nitride thereof, an oxide thereof or an oxynitride thereof.

After the sacrificial overcoat 110 has been formed, the magnetic head rowbar 150 is taken out from the vacuum chamber, and an air bearing surface rail is formed. After the air bearing surface rail has been formed, the magnetic head rowbar 150 is introduced into a vacuum chamber for forming an air bearing surface overcoat 100.

In the vacuum chamber for forming the protection film, first, the sacrificial overcoat 110 is peeled off. The sacrificial overcoat 110 is peeled off by, first, removing the hard amorphous carbon film with oxygen ions and, then, removing the amorphous silicon film with argon ions. Here, a sacrificial overcoat is used having a thickness of 12.0 nm, but the amount of removal is set to be 14.0 nm. In the step of removal, the sacrificial overcoat 110 may be removed by any amount provided the film can be removed by a sufficient amount. As for a method of removal, the method need not be limited to the one described above provided the sacrificial overcoat 110 can be removed by a sufficient amount.

After the removal of the sacrificial overcoat 110, the air bearing surface overcoat 100 is formed as shown in FIG. 4. First, a layer 102 is formed in a thickness of 0.5 nm for intimately adhering the air bearing surface overcoat. The layer 102 for intimately adhering the air bearing surface overcoat is formed on all three surfaces, i.e., first surface 003, second surface 004 and third surface 005 formed in the step of forming the slider rail, and on the side wall 031 and on the side wall 032.

Next, an uppermost layer 101 of the air bearing surface overcoat is formed maintaining a thickness of 2.5 nm relying upon the cathodic vacuum arc method. Like the layer 102 for intimately adhering the air bearing surface overcoat, the uppermost layer 101 of the air bearing surface protection layer, too, is formed on all three surfaces, i.e., first surface 003, second surface 004 and third surface 005 formed in the step of forming the slider rail, and on the side wall 031 and on the side wall 032. Here, as in Example 1, a surface graphite layer 104 which is not dense is also formed in the uppermost layer 101 of the air bearing surface simultaneously.

Thereafter, the machined surface 151 of the magnetic head rowbar is irradiated with the ion beam having ionic energy of about 100 eV at an angle of incidence of ions of about 70 degrees. Argon ions are used. The irradiation with the ion beam is continued until the air bearing surface overcoat 100 assumes a thickness of about 1.5 nm on the first surface 003. Here, the angle of incidence of ions is about 70 degrees on the first surface 003, second surface 004 and third surface 005, but is about 20 degrees on the side wall 031 and on the side wall 032. Therefore, the ions are injected in large amounts and stay in the air bearing surface overcoat 100 on the side wall 031 and on the side wall 032.

After the step of removing part of the air bearing surface overcoat 100 by the irradiation with the ion beam, the magnetic head rowbar 150 is taken out from the vacuum chamber, washed, and is mechanically cut to complete the magnetic head rowbar 150. In this embodiment, the sacrificial overcoat 110 is removed and the air bearing surface overcoat 100 is formed all in the same vacuum chamber, which, however, may be conducted by using a plurality of vacuum chambers.

Figure 13:
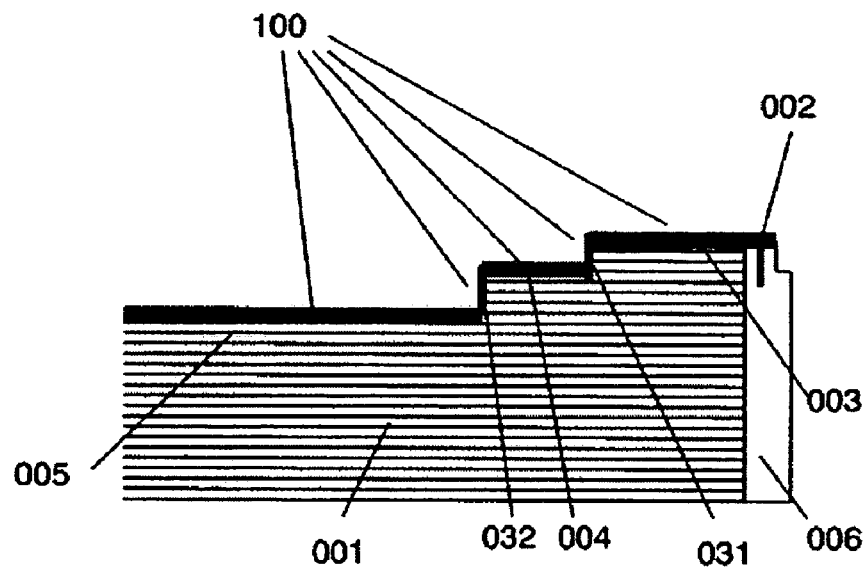
FIG. 13 is a view schematically illustrating, in cross section, part of the magnetic head slider of Example 2.

FIG. 13 is a view schematically illustrating, in cross section, the magnetic head slider produced in Example 2. Portions overlapping the magnetic head slider of Example 1 are omitted. The air bearing surface overcoat 100 is formed on the first surface 003, second surface 004, and third surface 005, and on the side wall 031 and on the side wall 032. Here, the thickness of the air bearing surface overcoat 100 is about 1.5 nm on the first surface 003, second surface 004 and third surface 005, and the thickness of the air bearing surface overcoat 100 is about 1.0 nm on the side wall 031 and on the side wall 032.

Observation of the air bearing surface of the magnetic head slider relying upon the Auger electron spectroscopy (AES) reveals the existence of argon in an amount of about 7 atomic % in a region up to a depth of 1.0 nm from the surface in the air bearing surface overcoat on the side wall 031 and on the side wall 032. It is further confirmed that argon exists in an amount of about 2 atomic % in the air bearing surface overcoat 100 on the first surface 003, second surface 004 and third surface 005. This is presumably due to the argon ion beam used in the step of removing part of the air bearing surface overcoat 100. Ions are irradiated in a manner that the angle of incidence of the ion beam is about 70 degrees with respect to the normal to the air bearing surface, whence the angle of incidence is about 20 degrees with respect to the normal to the surfaces of the side wall 031 and the side wall 032, permitting argon ions to be injected in large amounts.

The kind of ions used in the step of removing part of the air bearing surface overcoat 100 is not limited to argon but may be such an element as neon, helium, krypton or xenon. It is confirmed that the magnetic head slider produced above contains elements such as argon, neon, helium, krypton and xenon in an amount of not smaller than about 5 atomic % in a region of up to a depth of about 1.0 nm from the surface of the air bearing surface overcoat 100 on the side wall 031 and on the side wall 032.

Example 3

A method of producing a magnetic head slider of Example 3 will now be described. The method of producing the magnetic head slider according to Example 3 has a feature in that the protection film is formed twice in the step of producing the magnetic head slider like in the method of producing the magnetic head slider described in Example 2. Example 3 is different from Example 2 only with respect to the step of removing part of the air bearing surface overcoat 100 by the irradiation with the ion beam in the step of forming the air bearing surface overcoat 100.

Irradiation is conducted with the ion beam having ion beam energy of about 100 eV at an angle of incidence of ions of about 85 degrees. The irradiation with the ion beam is continued until the air bearing surface overcoat 100 assumes a thickness of 1.5 nm on the first surface 003. Here, the angle of incidence of ions is about 85 degrees with respect to the first surface 003, second surface 004 and third surface 005, but is about 5 degrees with respect to the side wall 031 and the side wall 032. The etching rate by the ion beam is fast on the side wall 031 and on the side wall 032 but is slow on the first surface 003, on the second surface 004 and on the third surface 005. In this Example, after having been irradiated with the ion beam, no protection film stays on the side wall 031 or on the side wall 032.

Figure 14:
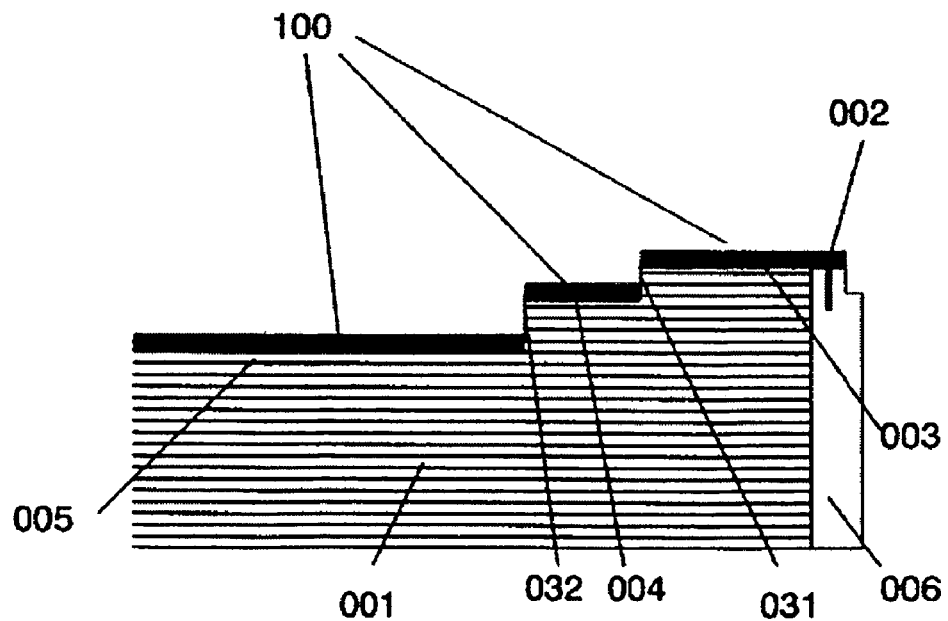
FIG. 14 is a view schematically illustrating, in cross section, part of the magnetic head slider of Example 3.

FIG. 14 is a view schematically illustrating, in cross section, the magnetic head slider produced in Example 3. The air bearing surface protection layer 100 is formed on the first surface 003, second surface 004 and third surface 005. The thickness of the air bearing surface overcoat 100 is about 1.5 nm on the first surface 003, second surface 004 and third surface 005. Unlike in Example 2, however, the air bearing surface overcoat 100 is formed on neither the side wall 031 nor on the side wall 032.

Example 4

Figure 3:
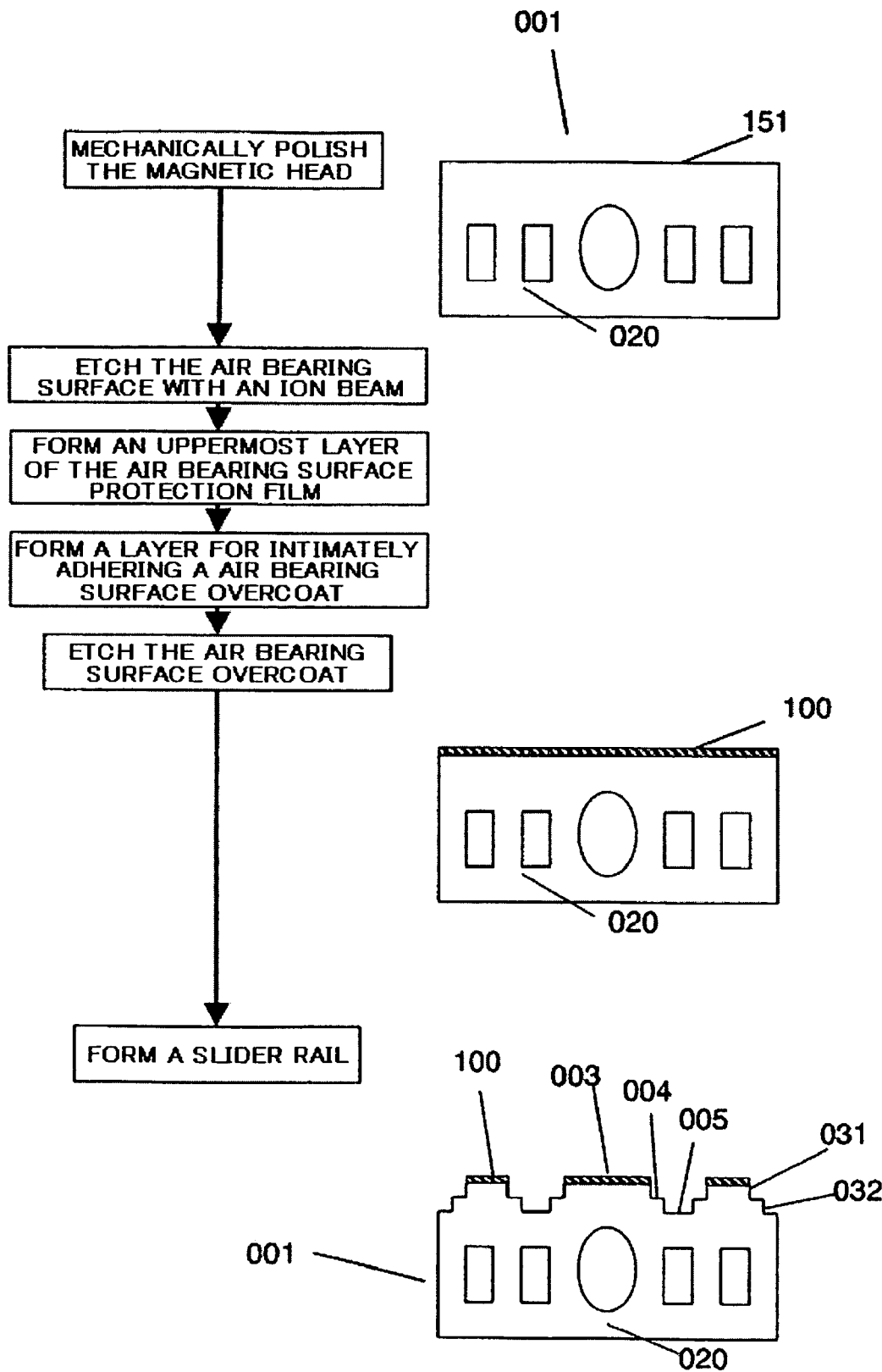
FIG. 3 is a diagram of a process flow illustrating the method of producing the magnetic head slider according to Example 4.

A method of producing the magnetic head slider of Example 4 will now be described with reference to FIG. 3. According to the method of producing the magnetic head slider of this Example 4, the magnetic head rowbar 150 is cut into a single magnetic head slider 001 and, thereafter, a slider rail is formed unlike the method of producing the magnetic head slider described in Examples 1 to 3 above. First, the magnetic head rowbar 150 is cut and is, then, mechanically polished in the form of the magnetic head slider 001. Thereafter, the magnetic head slider 001 is produced through the step of forming the protection film and the step of forming the slider rail described in Example 1 above.

The magnetic head sliders obtained as described above in Examples and in Comparative Examples are put to the corrosion testing to obtain the results as shown in FIG. 18. A high-temperature high-humidity testing is conducted in an environment of a temperature of about 85 degrees and a humidity of about 85% for 100 hours. When the magnetic head sliders changing the resistance of the magnetic resistance element after the high-temperature high-humidity testing are less than about 5% of the magnetic head sliders put to the testing, it can be so judged that the magnetic head sliders have a sufficient degree of corrosion resistance under a high-temperature and high-humidity environment. FIG. 18 shows the results of the magnetic head sliders tested under the high-temperature and high-humidity environment.

As shown in FIG. 18, Examples of this invention make it possible to obtain a hard surface layer and, hence, to provide a magnetic head slider having a sufficient degree of corrosion resistance in the protection film of a thickness of about 1.5 nm. In the Comparative Examples, on the other hand, a sufficient degree of corrosion resistance is not obtained in the protection film of a thickness of about 1.5 nm forming a graphite layer or a damaged layer on the surface thereof.

According to the method of producing the magnetic head slider in Examples of this invention, the air bearing surface overcoat which is dense having good covering performance is formed through a step of forming the air bearing surface overcoat and a step of removing part of the air bearing surface overcoat by the irradiation with an ion beam that is tilted with respect to a normal to the air bearing surface. Accordingly, there is obtained a magnetic head slider having improved corrosion resistance despite having a very thin film. It is, further, made possible to decrease the thickness of the air bearing surface overcoat of the magnetic head slider and, hence, to decrease the distance between the head and the disk to increase the recording density and, at the same time, to improve reliability in the magnetic recording and reproduction.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method of producing a magnetic head slider comprising:
    forming an air bearing surface overcoat on an air bearing surface of a slider;
    removing part of said air bearing surface overcoat by irradiation with an ion beam which is tilted with respect to the normal to the air bearing surface of the slider; and
    forming a rail in the air bearing surface of the slider on which said air bearing surface overcoat has been formed,
    wherein in removing part of said air bearing surface overcoat, the magnetic head slider and a sample are loaded onto a holder with the sample disposed near the air bearing surface of the slider,
    wherein the sample is for measuring a thickness of a film disposed on a surface of the sample, the sample irradiated with light, and ellipsometry is carried out while the sample is irradiated with an ion beam to analyze the thickness of the film on the surface of the sample from a polarized state of light reflected by said sample for measuring a thickness,
    wherein the analyzed thickness of the film on the surface of the sample is used to control the thickness of the part of the air bearing surface overcoat that is being removed.

2. A method of producing a magnetic head slider comprising:
    forming a sacrificial overcoat on an air bearing surface of a slider;
    forming a rail in the air bearing surface of the slider on which said sacrificial overcoat has been formed;
    removing said sacrificial overcoat;
    forming an air bearing surface overcoat on the air bearing surface of the slider from which said sacrificial overcoat has been removed; and
    removing part of said air bearing surface overcoat by an irradiation with an ion beam which is tilted with respect to a normal to the air bearing surface of the slider,
    wherein in removing part of said air bearing surface overcoat, the magnetic head slider and a sample are loaded onto a holder with the sample disposed near the air bearing surface of the slider,
    wherein the sample is for measuring a thickness of a film disposed on a surface of the sample, the sample is irradiated with light, and ellipsometry is carried out while the sample is irradiated with an ion beam to analyze the thickness of the film on the surface of the sample from a polarized state of light reflected by said sample for measuring the thickness,
    wherein the analyzed thickness of the film on the surface of the sample is used to control a thickness of a part of the air bearing surface overcoat that is to be removed.

3. The method of producing a magnetic head slider according to claim 1, wherein forming said air bearing surface overcoat includes forming a hard amorphous carbon film.

4. The method of producing a magnetic head slider according to claim 1, wherein forming said air bearing surface overcoat includes forming an amorphous silicon film and laminating a hard amorphous carbon film on said amorphous silicon film.

5. The method of producing a magnetic head slider according to claim 1, wherein an ionic energy of said ion beam is not larger than about 300 eV but is not smaller than about 25 eV.

6. The method of producing a magnetic head slider according to claim 2, wherein said sacrificial overcoat and said air bearing surface overcoat are each a single hard amorphous carbon film or a film stack of an amorphous silicon film and the hard amorphous carbon film.

7. The method of producing a magnetic head slider according to claim 2, wherein in removing part of said air bearing surface overcoat, an amount of ion beam current is measured while being irradiated with the ion beam by using an ion beam current measuring apparatus disposed near the air bearing surface of said slider, thereby to control the thickness of a part of the air bearing surface overcoat that is to be removed.

* * * * *